(12) United States Patent
Nicholson

(10) Patent No.: US 6,237,690 B1
(45) Date of Patent: May 29, 2001

(54) CONNECTOR ASSEMBLY

(75) Inventor: Joseph A. Nicholson, Cumbria (GB)

(73) Assignee: Tronic Limited, Cumbria (GB)

( * ) Notice: Subject to any disclaimer, the term of this patent is extended or adjusted under 35 U.S.C. 154(b) by 0 days.

(21) Appl. No.: 09/540,672

(22) Filed: Mar. 31, 2000

Related U.S. Application Data

(62) Division of application No. 09/007,301, filed on Jan. 14, 1998, now Pat. No. 6,053,253.

(30) Foreign Application Priority Data

Jan. 14, 1997 (GB) .................................................. 9700647

(51) Int. Cl.$^7$ .................................................. E21B 33/038
(52) U.S. Cl. .................. 166/338; 166/65.1; 166/342; 166/360; 166/368; 439/201; 439/310; 403/2
(58) Field of Search .................................... 166/338, 360, 166/368, 65.1; 439/201, 310; 403/2, 384, 387

(56) References Cited

U.S. PATENT DOCUMENTS

| | | | |
|---|---|---|---|
| 3,638,732 | * | 2/1972 | Huntsinger et al. ............. 166/368 X |
| 3,916,992 | * | 11/1975 | Boyadjieff et al. ............... 166/332.3 |
| 3,946,805 | * | 3/1976 | Peterman .............................. 166/349 |
| 4,153,109 | * | 5/1979 | Szescila ................................. 166/250 |
| 4,188,050 | * | 2/1980 | Lochte .............................. 166/341 X |
| 4,439,068 | * | 3/1984 | Pokladnik ........................ 166/338 X |
| 4,942,356 | * | 7/1990 | Ellingen et al. ...................... 324/156 |
| 5,558,532 | * | 9/1996 | Hopper .................................. 439/310 |
| 5,738,535 | * | 4/1998 | Cairns .............................. 439/310 X |
| 6,053,283 | * | 4/2000 | Nicholson ............................ 166/368 |

FOREIGN PATENT DOCUMENTS

2192316 * 1/1988 (GB) .

* cited by examiner

Primary Examiner—Eileen D. Lillis
Assistant Examiner—Jong-Suk Lee
(74) Attorney, Agent, or Firm—Alix, Yale & Ristas, LLP

(57) ABSTRACT

A connector assembly includes first and second connector parts. The first connector part has a bearing portion and the second connector part is connectable with the first connector part. A carriage comprises an abutment which is disposed against the first connector part and the carriage is reciprocatable between a forward position for connecting the connector parts and a retracted position for disconnecting the connector parts. A bias is provided for biasing the bearing against the abutment. The bearing portion and the abutment cooperate to permit pivoting of the first connector part in response to a force in any lateral direction on the first connector part. The first connector part may include a weakened portion providing a reduced resistance to shear. The connector assembly may also form part of a wellhead assembly.

9 Claims, 4 Drawing Sheets

CONNECTOR ASSEMBLY

CROSS-REFERENCES TO RELATED APPLICATIONS

This application is a divisional of application Ser. No. 09/007,301 filed on Jan. 14, 1998 now U.S. Pat. No. 6,053,253 which, in turn itself claims foreign priority from United Kingdom application number 9700647.2 filed on Jan. 14, 1997. A certified copy of the foreign priority document was filed in prior application Ser. No. 09/007,301 filed on Jan. 14, 1998.

BACKGROUND OF THE INVENTION

1. Field of the Invention

The invention relates to a connector assembly and to a wellhead assembly provide with such a connector assembly.

2. Description of the Related Art

It is known from U.S. Pat. No. 5,558,532 to provide an underwater wellhead assembly comprising a vertically oriented tubing hanger dispose in a spool body, and a connector assembly comprising a first connector part in the form of a plug body and a second connector part in the form of a receptacle for the plug body. The receptacle is arranged in the tubing hanger with its axis horizontal and the plug body is mounted by a carriage horizontally reciprocatable between a forward position in which the connector parts are connected and a retracted position in which the connector parts are disconnected. In the retracted position the plug body is fully withdrawn from the tubing hanger so that it is then possible to remove the tubing hanger, together with the receptacle, vertically from the spool body and to take it to surface for repair or modification. Each time the tubing hanger is returned to the spool body it has to be accurately located so that the connector parts are in alignment with each other. However, because of manufacturing tolerances exact alignment is not always achieved, and there may be a lateral offset between the longitudinal axes of the connectors (lateral misalignment), or an angular misalignment between the axes, or a combination of the two. If there is misalignment, there may be a problem in that the plug body cannot properly engage the receptacle during the forward movement of the carriage.

To deal with this problem, we have previously proposed a mounting arrangement for the plug body on the carriage which allows lateral movement of the plug body relative to the carriage, and limited pivotal movement about a vertical axis only. This mounting arrangement consists of a pair of radially outwardly projecting circumferential flanges on the plug body, the flanges being longitudinally spaced from each other, and a split ring on the carriage projecting radially inwardly into the space between the flanges. An O-ring is disposed around the plug body radially inwardly of the split ring. The plug body is able to move laterally relative to the carriage, if necessary to correct lateral misalignment as it engages in the receptacle, by deforming the O-ring. In addition, because the split ring projects into the space between the plug body flanges at the top and the bottom of the plug body, but not at the sides, a small amount of pivotal movement about a vertical axis is possible to correct angular misalignment.

Such a mounting arrangement works well. In some circumstances, however, for example when the receptacle is arranged with its central longitudinal axis tangential to a circle about the central vertical axis of the tubing hanger (rather than radially of the tubing hanger), it is necessary to design the plug body and mounting with a relatively long portion of the plug body projecting forwardly of the mounting. The weight of the forwardly projecting portion creates a couple which increases friction at the mounting and thus restricts its ability to allow the plug body to move relative to the carriage during correction to correct any misalignment. Another possible cause of restricted movement at the mounting is the presence of sand or other debris, which may create a problem even if the forwardly projecting portion of the plug body is relatively short.

According to a first inventive aspect there is provided a connector assembly comprising first and second connector parts, the first connector part being mounted by a carriage reciprocatable between a forward position for connecting the connector parts and a retracted position for disconnecting the connector parts, wherein the mounting of the first connector part by the carriage is such as to permit pivoting of the first connector part in response to a force in any lateral direction on the first connector part and acting at a location forward of the mounting.

If there is misalignment of the connector parts when disconnected, as they are brought into engagement the first connector part can align itself with the second connector part. The pivotal mounting of the first connector part enables the correction in alignment to be achieved. Thus any tendency for the first connector part to become jammed during the connection process as a result of misalignment is reduced.

The lateral force may for example be horizontal or vertical, both of these being lateral to the longitudinal axis of the first connector part, or a combination of the two, depending on the direction of misalignment to be corrected. As discussed above, there may be a tendency for the first connector part to tilt downwardly, when disconnected, due to the weight of the portion of the first connector part projecting forwardly of the mounting. In such a situation, since the mounting can permit downward pivoting about a horizontal axis, its functioning will not be impaired by increased friction, as in the known mounting system. The downward tilting can be reversed as the first and second connector parts engage with each other and a correcting lateral (i.e. upward) force is applied by the second connector part to the first connector part.

Preferably, one of the connector parts is a plug body and the other a plug receptacle. In order to help correct misalignment during the forward stroke of the carriage, the plug body may have an externally chamfered nose whilst the plug receptacle may have an internally chamfered mouth. If there is misalignment, the chamfers allow the nose to engage in the mouth during the carriage forward stroke. It is preferred that the first connector part is the plug body and that the second connector part is the plug receptacle, although the reverse arrangement is possible.

The connection to be made may be electrical (such as low power for gauges or other instrumentation or high power for powering equipment such as a down hole pump) or optical or a mixture of the two. A preferred connector, having first and second connector parts for use in the connector assembly, is described in GB-A-2 192 316.

Another cause of an initial angular misalignment of the first connector part, in addition to the downward tilting mentioned above, may be an eccentric load applied by a cable extending from the rear of the first connector part. In many cases, the problem of an initial angular misalignment is overcome, as the desired final orientation of the first connector part can be achieved by the application of a correcting lateral force by the second connector part as the two are brought into engagement. The pivotal mounting enables this to be achieved. However, in situations where the length of the first connector part projecting forwardly of the mounting is relatively long (as in the case for example of a non-radial entry to a tubing hanger mentioned above), there is a corresponding increased effect of any angular misalignment at the front end of the first connector part, where it first engages with the second connector part during the forward stroke of the carriage. In an extreme case, it may not be possible to achieve connection.

Preferably, therefore, the mounting is such as to centre and align the first connector part along a predetermined axis when the carriage is in the retracted position. Such an arrangement ensures that the first connector part is in the proper orientation relative to the carriage, despite any forces applied to the first connector part by its own weight or a cable connected to it. There may of course still be misalignment between the first and second connector parts, caused by misalignment of the carriage relative to the second connector part, but this will normally be small and readily correctable during the connection process.

Apart from an angular misalignment relative to the axial direction there may be a lateral offset and therefore preferably the mounting of the first connector part is such as to permit lateral movement of the first connector part relative to the carriage.

In a preferred arrangement the first connector part is resiliently mounted by the carriage. This can be useful in achieving a proper connection between the first and second connector parts. For example, the assembly can be designed such that the first and second connector parts are fully connected and seated against each other slightly before the carriage completes its forward stroke to the forward position, with the additional movement of the carriage being permitted by the resilience of the mounting. Thus the carriage can be arranged to move forward by more than the first connector part, reducing the chance that there will not be a proper connection because of manufacturing errors or because of debris preventing the carriage from completing its forward stroke.

The first connector part may be mounted in a block of resilient material, such as a solid rubber bushing. However, in certain uses of the connector assembly, such as in a wellhead, the resilient material would have to be tolerant of the well completion fluid (generally brine), of high temperatures (typically 145° C. or more at certain times), and would preferably not be susceptible to compression set. It is therefore generally preferred to provide resilience by the use of one or more springs of steel or the like.

Preferably the first connector part has a bearing portion biased against an abutment of the carriage. Such a bearing arrangement should permit pivoting of the first connector part and preferably also will be such as to centre and align the first connector part when disconnected. This can be achieved if the bearing portion has a conical face engaging a conical face of the abutment. One conical face will be "concave", in the form of a cup, and the other will be "convex". The convex conical face will thus be able to "rock" within the concave conical face to provide the desired pivotal movement. Preferably, the convex conical face belongs to the first connector part and the concave conical face to the carriage, but the reverse is possible. By providing adequate lateral clearance between the bearing portion and the abutment, relative lateral movement will also be possible.

Advantageously, the bias of the bearing portion of first connector part against the abutment of the carriage is resilient, thus providing the mounting with its preferred resilience. Although the bearing portion could be biased rearwardly, e.g. by one or more springs, it is preferred that the bearing portion is forwardly biased.

Preferably, the bias is provided by a compression spring coiled round a shaft projecting rearwardly of the bearing portion and biasing the bearing portion forwardly against the abutment. This provides an economical use of space whilst also enabling some longitudinal play allowing the carriage to stroke forward by more than the forward movement required by the first connector part to achieve proper connection.

If the connection involves the mating of a single centrally located pin in a corresponding socket, then it may not be essential to maintain the first and second connector parts rotationally aligned when disconnected. Preferably, however, there is provided means for preventing rotation of the first connector part relative to the carriage about a longitudinal axis. This may for example take the form of a longitudinally arranged pin engaging in a corresponding hole.

In our known mounting arrangement described above, a cable protrudes from the rear end of the plug body, at an angle to the longitudinal axis and at an off-centre location. This can result in the cable applying a force to the plug body which causes it to be out of alignment with the carriage. In order to minimise such a problem, a preferred embodiment of the present invention comprises a cable extending axially and centrally from a rear end of the first connector part. It may be desired to form the cable to the rear of the first connector part into a coil about a longitudinal axis, in order to accommodate forward and rearward reciprocating movement of the first connector part. In this arrangement, since the deviation of the cable from the central axis first occurs behind the first connector part, it has a reduced potential for eccentric loading on the first connector part than in the known mounting arrangement.

SUMMARY OF THE INVENTION

The connector assembly is preferably an underwater or other severe environment connector assembly. It is envisaged that it will be particularly useful as part of a wellhead installation.

A preferred embodiment therefore comprises a wellhead assembly comprising a radially inner member, a radially outer member, and a connector assembly as described above, wherein the carriage and the first connector part of the connector assembly are carried by the radially outer member and the second connector part is carried by the radially inner member.

With such an arrangement, when the carriage is in the retracted position, the connector parts are disconnected and allow relative axial movement of the radially inner and outer members. The radially inner member may for example be a tubing hanger and the radially outer member a spool body.

In known connector assemblies there may in some circumstances be difficulties in withdrawing the carriage to the retracted position, for example due to a failure of an actuator for the carriage, or seizure of the carriage in its guide, or seizure of the connector parts in their connected condition. If this happens, it may be desired to try and recover one of the two members which carry the respective connector parts of the connector assembly, without recovering the other member. In the example mentioned above of a wellhead assembly, it may be desired to remove the tubing hanger from the spool body to take it to surface for repair or modification. If however the carriage cannot be retracted then the first connector part will normally prevent recovery of one of the members without the other, because it extends between the two when the carriage is in the forward position.

According to a second inventive aspect there is provided a connector assembly comprising first and second connector parts, the first connector part being mounted by a carriage reciprocatable between a forward position for connecting the connector parts and a retracted position for disconnecting the connector parts, wherein the first connector part comprises a weakened portion providing a reduced resistance to shear.

With such an arrangement the first connector part can if necessary be sheared at the weakened portion. Although this will result in the destruction of the first connector part, this may be a justifiable sacrifice if it enables recovery of a member carrying the first or second connector part. Thus, if the carriage and the first connector part are carried by a first member, and the second connector part is carried by a second member, then one of the members may be recovered, even if the carriage cannot be retracted, by shearing the first connector part.

The shear load may for example be reduced from an order of 20 tonnes to an order of 6 to 9 tonnes at the weakened portion.

In one embodiment, the weakened portion is located on the first connector part at a region adjacent to a front end of the second connector part when the connector parts are connected (the "front end" of the second connector part meaning the end nearest the carriage). Such an arrangement is useful for example if the second connector part is to be carried by a second member with its front end at the periphery of the second member, so that shear can occur at the periphery. It may also be useful if the second connector part is to be carried by a second member with its front end inwardly (i.e. rearwardly in relation to the second connector part) of the periphery of the second member. Shearing of the first connector part can then occur at the front end of the second connector part, inwardly of the periphery. However, in this latter disposition of the connector assembly, an alternative embodiment comprises the location of the weakened portion on the first connector part at a region rearwardly of a front end of the second connector part when the connector parts are connected (i.e. rearwardly in relation to the first connector part). For example, the weakened portion can be located at the periphery of the second member which carries the second connector part, so that shear can occur at this point.

The weakened part may be in the form of a peripherally extending groove in an outer wall of the first connector part. It may run transverse to the longitudinal axis, or at a non-perpendicular angle to the longitudinal axis, for example to correspond to the profile of the periphery of a second member as viewed in the direction of shear.

One of the connector parts is preferably a plug and the other a receptacle, with the plug being receivable in the receptacle to make a connection. Preferably, the first connector part is the plug and the second connector part the receptacle, although the reverse arrangement is possible.

It is expected that the connector assembly including a first connector part with a weakened region will be particularly useful as part of a wellhead installation.

A preferred embodiment therefore comprises a wellhead assembly comprising a radially inner member, a radially outer member, and a connector assembly comprising first and second connector parts, the first connector part being mounted by a carriage reciprocatable between a forward position for connecting the connector parts and a retracted position for disconnecting the connector parts, wherein the carriage and the first connector part of the connector assembly are carried by the radially outer member and the second connector part is carried by the radially inner member, and wherein the first connector part comprises a weakened portion providing a reduced resistance to shear.

If it is desired to remove the radially inner member from the radially outer member, this can be achieved even if the carriage cannot be retracted, by shearing the first connector part.

BRIEF DESCRIPTION OF THE DRAWINGS

Certain preferred embodiments of the invention will now be described by way of example and with reference to the accompanying drawings in which.

DETAILED DESCRIPTION OF THE PREFERRED EMBODIMENTS

Figure 6:
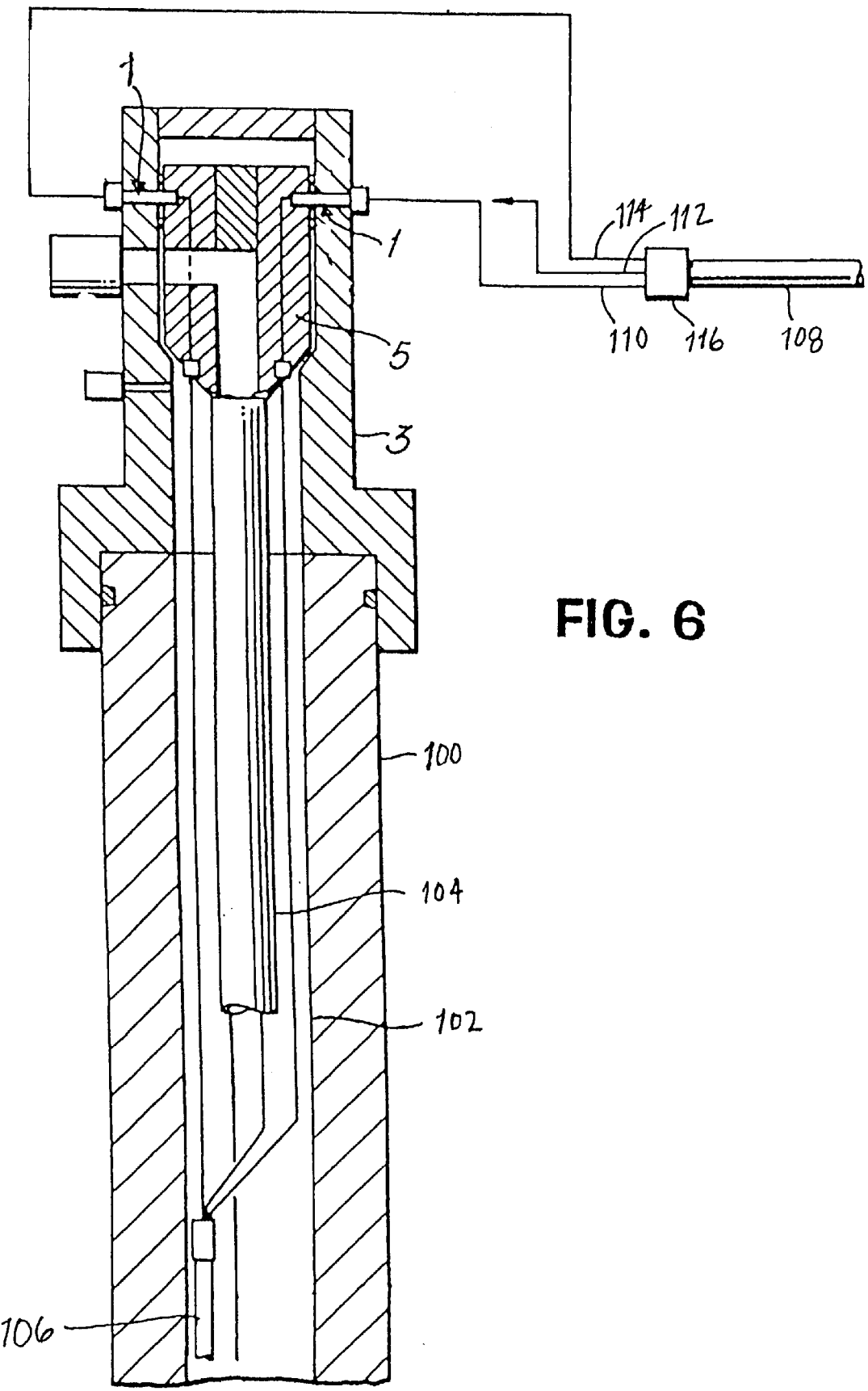
FIG. 6 is a diagrammatic axial section through a wellhead assembly.

A wellhead assembly is illustrated in FIG. 6. The wellhead assembly comprises a wellhead 100 capping a production casing 102. A spool body 3 is installed upon the wellhead 100 and production tubing 104 is run into the casing 102 until a tubing hangar 5 seats in the spool body 3.

A downhole pump 106 is provided with three phase power from a power cable 108. This cable is split into three single power cores 110, 112 and 114 at a junction box 116. The three single power cores 110, 112 and 114 are connected to the spool body 3 by three connector assemblies 1.

Figure 1:
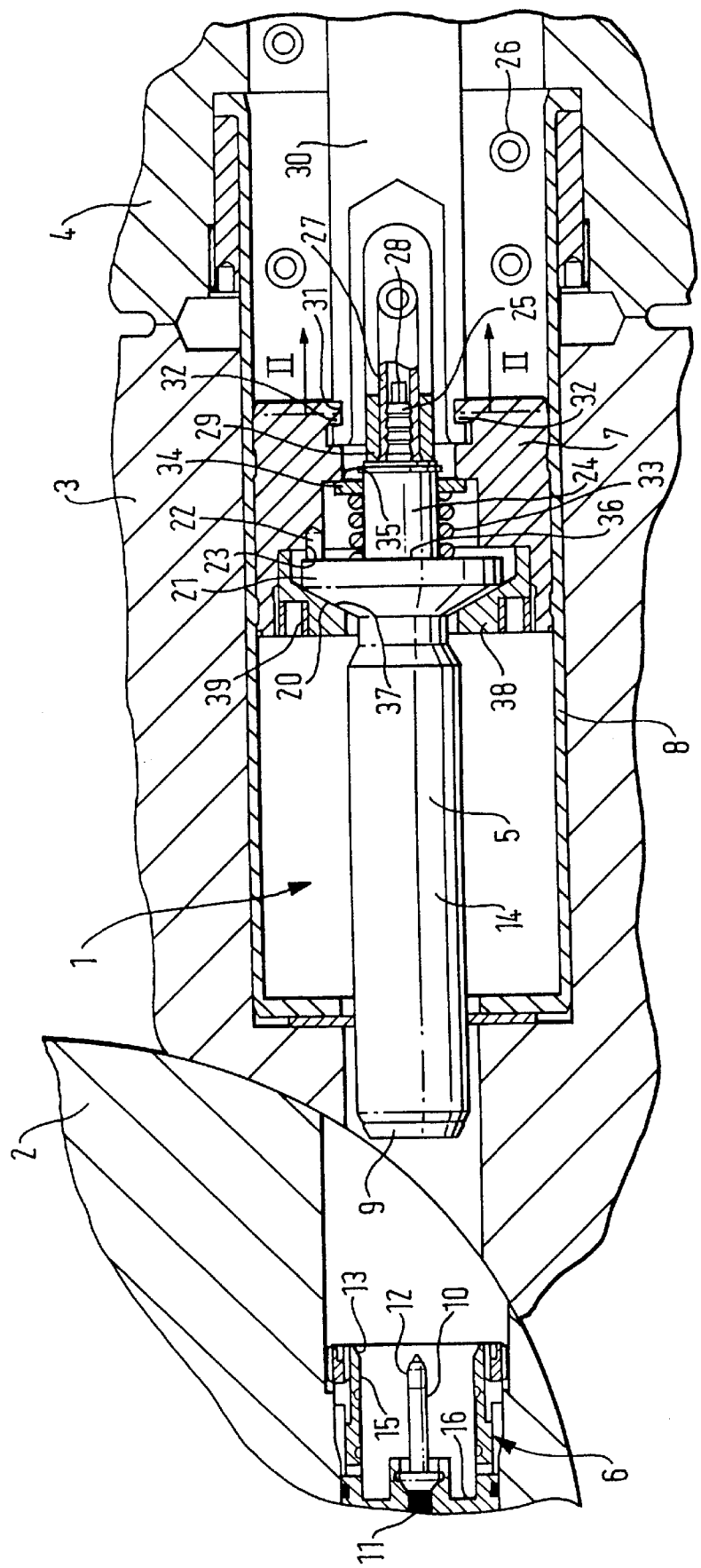
FIG. 1 is a longitudinal sectional view, in a horizontal plane, of a first embodiment of connector assembly in a wellhead installation.

Referring to FIG. 1, a connector assembly 1 is installed in a wellhead installation which includes a radially inner member in the form of a tubing hanger 2 and radially outer members comprising a spool body 3 and a bonnet 4. The connector assembly 1 comprises a first connector part in the form of a plug body 5 and a second connector part in the form of a receptacle 6. The plug body 5 has an outer wall 14. It is supported by a carriage 7 which is longitudinally reciprocatable in a guide tube 8. The carriage 7 is shown in its retracted position in which a chamfered front end 9 of the plug body 5 is disposed rearwardly of the tubing hanger 2.

The receptacle 6 of the connector assembly is carried by the tubing hanger with its longitudinal axis tangential to a circle about the central vertical axis of the tubing hanger 2. It is disposed inwardly of the outer periphery of the tubing hanger. It includes an electrical contact pin 10 which at its front end has a contact portion 12 and at its rear is connected to a down hole instrument cable 11. The receptacle 6 has an inner wall 15 terminating at its front end in a chamfered mouth 13. A rear end wall 16 is located at the rear of the receptacle.

The contact pin 10 is arranged to be received in a contact sleeve (not shown) internally of the plug body 5. The internal components of the plug body 5 are not shown as they are known. A typical arrangement of the internal components may be in accordance with the teachings of GB-A-2 192 316. In this known arrangement the contact sleeve is received in an inner chamber containing dielectric oil and having a wall formed of a flexible membrane, the inner chamber being located within an outer chamber also containing dielectric oil and having a wall formed of a flexible membrane. This latter wall is exposed to pressure outside the plug body. When the plug body is disconnected, a shuttle pin is forwardly spring biased to a position in which it passes through the contact sleeve, through a seal at the front of the inner chamber and through a seal at the front of the outer chamber. During connection, the contact pin 10 pushes the shuttle pin rearwardly so that the pin then passes through the outer and inner chamber seals and its contact portion 12 is received in the contact sleeve.

Other constructions and arrangements for the internal components of the connector parts 5 and 6 are of course possible. In particular, the plug body may be received by the tubing hanger 2 and the receptacle may be mounted by the carriage 7. The plug body may have a single dielectric oil containing chamber, rather than inner and outer chambers as described above. Multipin arrangements could be used in addition to the single pin arrangement shown in FIG. 1.

At its rear end the plug body 5 is provided with a compliant mounting. The plug body has a bearing portion in the form of a laterally outwardly extending and forward facing conical face 20, which is "convex" as viewed in FIG. 1. A cylindrical portion 21 of the same diameter as the maximum diameter of the conical face 20 is disposed to the rear of the conical face. A location pin 22 projects rearwardly from the cylindrical portion 21 and locates in a slot 23 formed in the carriage 7, in order to prevent rotation of the plug about its longitudinal axis. A cylindrical shaft 24 projects coaxially rearwardly of the cylindrical portion 21 and a barbed cable connector 25 projects coaxially rearwardly of the shaft 24. A cable 26 comprising a rubber tube 27 and a pair of cable wires 28 protrudes axially from the rear of the plug body 5 and then deviates laterally into a coiled form. The cable 26 is retained on the barbed cable connector 25 by a tube retaining sleeve 29. A part-cylindrical actuator stem 30 is formed at its front end with upper and lower slots 31 engaged by lugs 32 of the carriage 7. The tube retaining sleeve 29 is received in the hollow portion of the stem 30 in a manner which permits it to move in any lateral direction (see FIG. 2). The stem 30 extends rearwardly to an actuator mechanism, which can be of any known design. The cable 26 is coiled about the stem 30 so that it can readily accommodate longitudinal movement of the carriage 7.

A compression spring 33 is disposed about the shaft 24 of the plug body 5 and acts between a thrust washer 34 retained by a shoulder 35 of the carriage 7 and a rear face 36 of the cylindrical portion 21. The spring 33 thus urges the plug body forwardly in a resilient manner, such that the conical face 20 engages an abutment of the carriage 7, in the form of a conical face 37 of a cup washer 38. The conical face 37 is "concave" as viewed in FIG. 1. The cup washer 38 is retained in the carriage 7 by a locking ring 39. The maximum diameter of the conical face 37 of the cup washer 38 is greater than that of the conical face 20 of the plug body 5, thereby permitting relative pivoting and lateral movement. It will be noted that the interengaging conical faces 20 and 37, under the bias of the spring 33 tend to centre the plug body along the central longitudinal axis of the carriage 7. The force of the spring 33 will be generally sufficient to do this despite the weight of the plug body 5 projecting forwardly of the mounting.

The operation of the connector assembly will now be described. In order to stroke the plug body 5 forwardly, the actuating mechanism (not showed) is operated and the stem 30 urges the carriage 7 and the plug body 5 forwardly. If there is misalignment between the plug body 5 and the receptacle 6 then this will be corrected as the chamfered front end 9 of the plug body engages in the chamfered mouth 13 of the receptacle 6. The mouth 13 effectively applies an initial lateral force to the front end 9. With further forward movement of the plug body, the engagement between the plug outer wall 14 and the receptacle inner wall 15 brings the respective component parts fully into alignment. The compliant mounting of the plug body on the carriage permits any necessary correction in alignment to take place.

The connector assembly is designed so that the front end 9 of the plug body 5 engages the rear end wall 16 of the receptacle slightly before the carriage 7 completes its forward stroke. The additional forward movement of the carriage 7 relative to the plug 5 is taken up by compression of the spring 33. This arrangement ensures that the connection is completed even if the carriage cannot quite complete its normal stroke, for example due to manufacturing errors or the presence of debris within the carriage guide 8. Also, if the plug body 5 has to move rearwardly relative to the carriage 7 in the course of correcting any misalignment, then it is desirable that the carriage can move forward enough to complete the mating of the plug body 5 in the receptacle 6.

Figure 3:
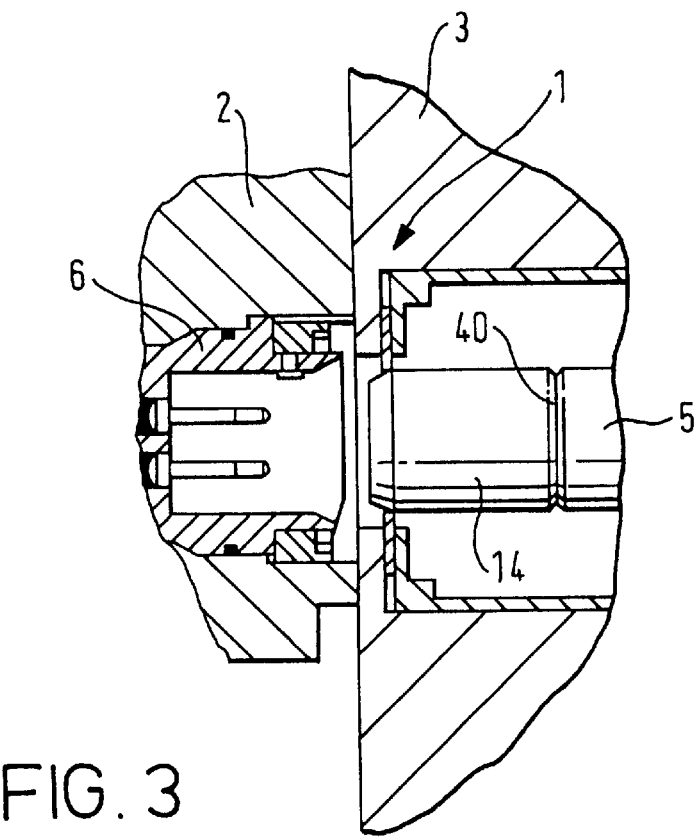
FIGS. 3, 4 and 5 are respective partial longitudinal sectional views (in a vertical plane) of second, third and fourth embodiments respectively of connector assemblies in wellhead installations.

A second embodiment of connector assembly 1 is shown in FIG. 3. This shows a section taken in a vertical plane, unlike the section of FIG. 1 which is in a horizontal plane. The receptacle 6 is arranged with its central longitudinal axis positioned radially of the tubing hanger, unlike the arrangement shown in FIG. 1. This embodiment also differs from the first embodiment in that it shows a multipin connector assembly. An important difference is the presence of a weakened region 40 in the outer wall 14 of the plug body 5. The weakened portion is positioned so as to be located at the periphery of the tubing hanger 2 when the plug body 5 and receptacle 6 are fully mated. Thus, if for any reason it is not possible to withdraw the plug body from the receptacle, the plug body 5 can be sheared at the weakened portion 40 to enable the tubing hanger 2 to be vertically lifted from the spool body 3.

The weakened portion 40 comprises an annular groove in the outer wall 14. In one example, the wall has a nominal thickness of 0.1595 inches and the groove has a nominal depth of 0.1125 inches, thereby reducing the thickness of the wall at the weakened portion 40 to a nominal value of 0.047 inches. The groove preferably has a "V" shape as viewed in cross-section, enclosing for example an angle of 65°. Such an arrangement, in a steel plug body, can provide a shear strength of the plug body and its components at the weakened portion 40 of about 6 to 9 metric tonnes.

Figure 2:
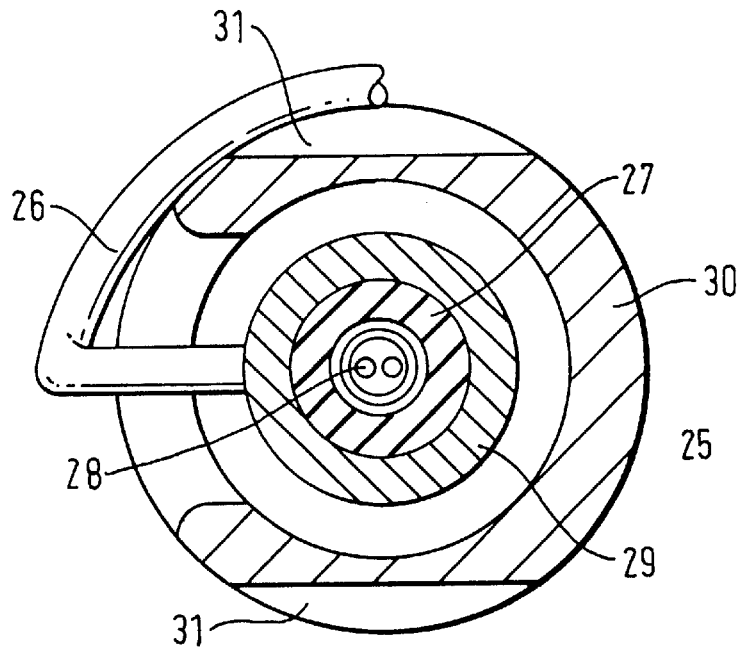
FIG. 2 is a cross-sectional view through an actuator stem of the connector assembly, along the lines II—II of FIG. 1.
Figure 4:
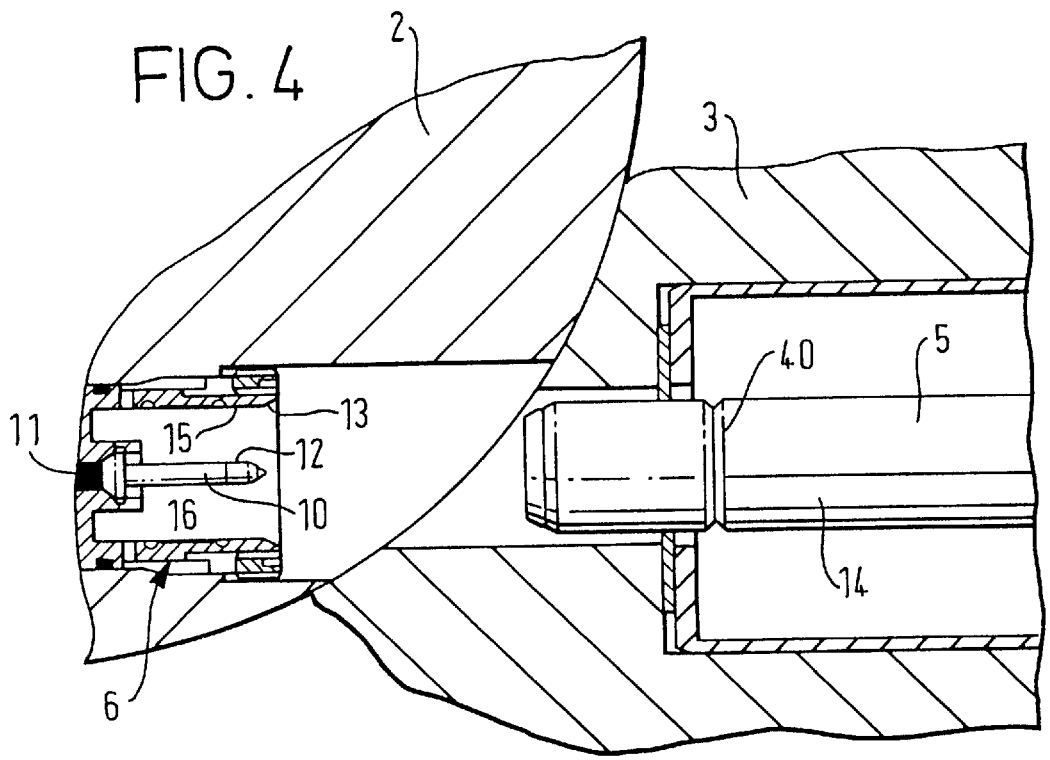
Figure 5:
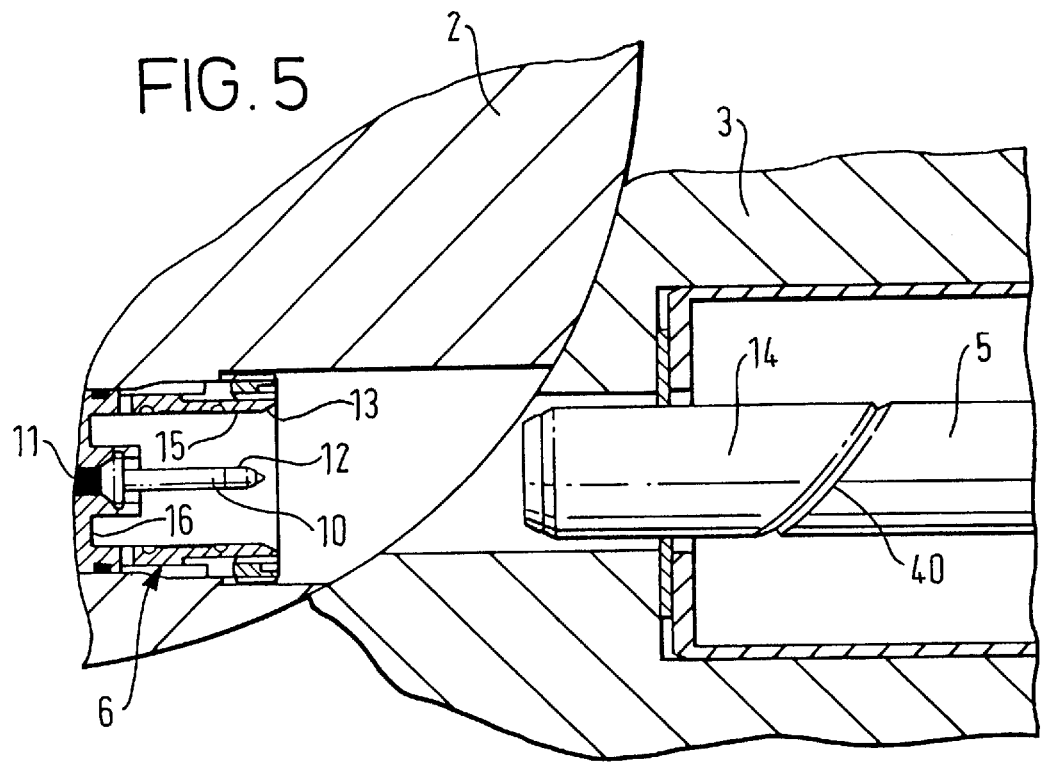

The third and fourth embodiments of FIGS. 4 and 5 are similar to the first embodiment of FIGS. 1 and 2, except that the plug body 5 includes weakened portions 40. In the embodiment of FIG. 4 the weakened portion is positioned so as to be at the mouth 13 of the receptacle 6 when the connector is fully mated, so as to promote shear in this region if it is necessary to lift the tubing hanger without first being able to withdraw the plug body 5 from the receptacle 6.

In the embodiment of FIG. 5, the weakened portion 40 has a curved profile corresponding to that of the outer periphery of the tubing hanger 2, so as to promote shearing in this region if it is necessary to lift the tubing hanger from the spool body without first retracting the plug body 5.

What is claimed is:

1. A connector assembly comprising:

a first connector part;

a second connector part connectable with the first connector part; and a carriage mounting the first connector part and being reciprocatable between a forward position in which the first and second connector parts are connected together and a retracted position in which the first and second connector parts are disconnected;

wherein the first connector part comprises a weakened portion adapted for providing a reduced resistance to shear such that the first connector part can be sheared at the weakened portion when it is not possible to withdraw the first connector part from the second connector part.

2. The connector assembly of claim 1, wherein the weakened portion is located on the first connector part at a region adjacent to a front end of the second connector part when the first and second connector parts are connected.

3. The connector assembly of claim 1, wherein the weakened portion is located on the first connector part at a region rearwardly of a front end of the second connector part when the first and second connector parts are connected.

4. The connector assembly of claim 1, wherein the first connector part has an outer wall and wherein the weakened portion is in the form of a peripherally extending groove in the outer wall.

5. The connector assembly of claim 4, wherein the groove has a "V" shape as viewed in cross-section.

6. The connector assembly of claim 1, wherein the weakened portion runs transverse to a longitudinal axis of the first connector part.

7. The connector assembly of claim 1, wherein the weakened portion runs at a non-perpendicular angle to a longitudinal axis of the first connector part.

8. The connector assembly of claim 1, wherein the first connector part is a plug and the second connector part is a receptacle, the plug being receivable in the receptacle to make a connection.

9. The connector assembly of claim 1, wherein said connector assembly forms part of a wellhead assembly, the wellhead assembly further comprising a radially inner member, and a radially outer member, and wherein the carriage and the first connector part of the connector assembly are carried by the radially outer member and the second connector part is carried by the radially inner member.

* * * * *